United States Patent
Kakadia et al.

(10) Patent No.: US 7,839,789 B2
(45) Date of Patent: Nov. 23, 2010

(54) SYSTEM AND METHOD FOR MULTI-LAYER NETWORK ANALYSIS AND DESIGN

(75) Inventors: Deepak Kakadia, Union City, CA (US); Jay J. Lee, San Ramon, CA (US); Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 93 days.

(21) Appl. No.: 12/334,681

(22) Filed: Dec. 15, 2008

(65) Prior Publication Data

US 2010/0149993 A1    Jun. 17, 2010

(51) Int. Cl.
    H04L 1/00    (2006.01)
(52) U.S. Cl. .................. 370/235; 370/248; 370/252
(58) Field of Classification Search .......... 370/216, 370/235, 248, 252
    See application file for complete search history.

(56) References Cited

U.S. PATENT DOCUMENTS

| | | | |
|---|---|---|---|
| 6,594,261 B1 * | 7/2003 | Boura et al. ............... 370/389 |
| 7,200,117 B2 * | 4/2007 | Chiu et al. ................ 370/238 |
| 7,424,546 B1 * | 9/2008 | Aweya et al. ............. 709/232 |
| 7,450,496 B1 * | 11/2008 | Doverspike et al. ....... 370/217 |
| 7,555,017 B2 * | 6/2009 | Shay et al. ................ 370/510 |
| 7,593,321 B2 * | 9/2009 | Galand et al. ............. 370/218 |
| 2006/0189322 A1 * | 8/2006 | Conte et al. ............... 455/453 |
| 2008/0104218 A1 * | 5/2008 | Liang et al. ............... 709/223 |
| 2008/0155087 A1 * | 6/2008 | Blouin et al. ............. 709/223 |
| 2008/0232257 A1 * | 9/2008 | Hariharan et al. ......... 370/237 |
| 2009/0077246 A1 * | 3/2009 | Lee .......................... 709/229 |
| 2009/0310501 A1 * | 12/2009 | Catovic et al. ............ 370/252 |
| 2010/0106820 A1 * | 4/2010 | Gulati et al. .............. 709/224 |

* cited by examiner

*Primary Examiner*—Andrew Lee (57) ABSTRACT

Techniques for providing a method and system for multi-layer network analysis and design are disclosed. In one particular exemplary embodiment, the techniques may be realized as a method, comprising determining, using a computer model of a network, a minimum probability of failure path between a pair of network nodes at a first network layer for one or more pairs of network nodes, calculating, using a processor and stored network data, a value for the minimum probability of failure for the identified minimum probability of failure path between the pair of network nodes at the first network layer for the one or more pairs of network nodes. The method may include identifying a maximum of the determined minimum probability of failure values for the one or more pairs of network nodes for the first network layer. The method may include probability of failure calculations for one or more secondary network layers.

22 Claims, 4 Drawing Sheets

SYSTEM AND METHOD FOR MULTI-LAYER NETWORK ANALYSIS AND DESIGN

BACKGROUND INFORMATION

Wireless service providers may have a minimum level of network availability requirements; for example, 99.999% of network availability, or less than $10^{-5}$ of the probability of network (PF) failure. The design of networks may involve different teams with different skill sets, which may include, IP Multimedia Subsystems (IMS) services, data and transport groups. Different teams may work independently and efforts may not be aligned. Some layers of the network (e.g., Synchronous Optical Networking (SONET) and Wavelength Division Multiplexing (WDM) layers of networks) may be over engineered and other layers (e.g., Internet Protocol (IP)/Multi-Protocol Label Switching (MPLS) layers of networks) may be under engineered, which may result in an overall system wide network that is sub optimal.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description is exemplary and explanatory only and is not restrictive.

An exemplary embodiment provides a multi-layer network analysis and design system. The multi-layer network analysis and design system may enable analysis and identification of minimum probability of failure paths and values for one or more layers of a multi-layer network.

According to an exemplary embodiment, a method of finding a target network availability common to one or more multi-layer/multi-domain networks is described below. The method may thus meet the target network availability requirements of the overall network as a system. Many end-to-end networks may be cascaded with different layers such as IP, MPLS, Ethernet, SONET, WDM and/or other layers, the method of specifying the highest network availability to multi-layer/multi-domain networks may be very useful. Compared to the conventional method of meeting the network availability of each layer network independently, the proposed method may enable determination of the value for a minimum probability of failure path between two nodes on a network layer. This determination may be extended to identify the highest value of a minimum probability of failure path for a plurality of node pairs in the network layer. The determination may be extended again to identify the highest value of a minimum probability of failure path for a node pair across a plurality of layers of the network. This determination may be made excluding calculation of redundant failure scenarios (e.g., calculations of failure of a combination of network elements may not be performed since the failure of the network elements of the combination has already been calculated and calculating the combination of the elements may add complexity without a significant increase in accuracy.) Thus, by simplifying the calculations and using graph theory to identify minimum probability of failure paths, a highest value minimum probability of failure path of node pairs may be identified for a plurality of nodes of a plurality of layers of a network. This value may be used as a benchmark number for network availability so that network engineering and analysis efforts may share a common target. An identified common target number for network availability may prevent the use of extra and/or unneeded resources once a network layer meets the target number. Additionally, the use of a target number may enable a user to determine that a network layer needs further engineering and/or design to increase its availability. This may result in lower cost with the target network availability for the overall network as a system.

Figure 1:
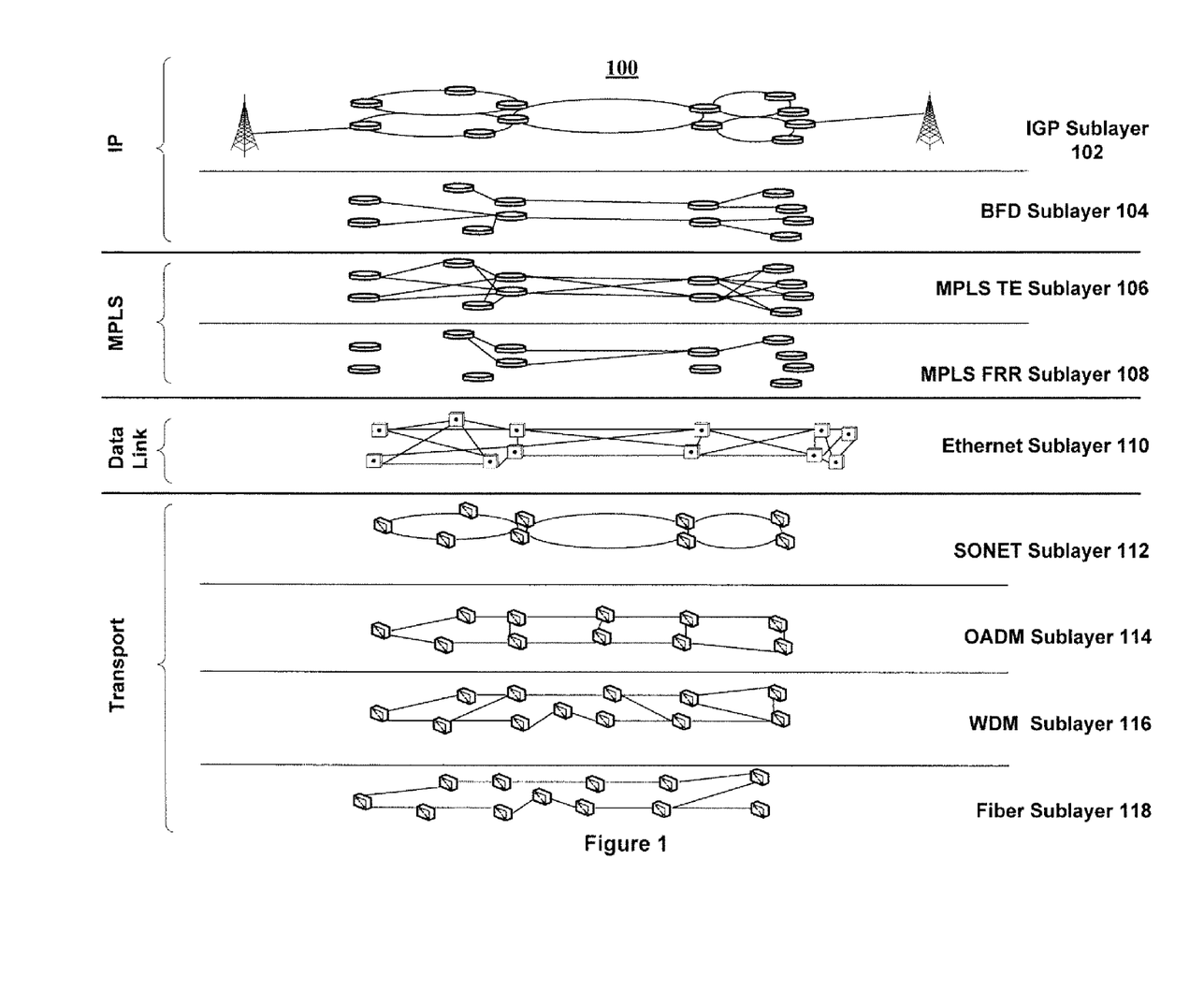
FIG. 1 is a schematic of a multi-layer network, in accordance with an exemplary embodiment.

Referring to FIG. 1, a multi-layer network in accordance with an exemplary embodiment is illustrated. It is noted that system 100 is a simplified view of a multi-layer network and may include additional elements that are not depicted. System 100 depicts the network layers in a typical wireless service provider IP transport network. It should be appreciated however, that embodiments are not limited to these layers or to an IP transport network. Embodiments may be implemented on various networks using layered protocols, such as, but not limited to, networks using protocols at two or more layers. Networks may be local area networks (LAN), wide area networks (WAN), the Internet, a Public Switched Telephone Network (PSTN), cellular networks, satellite networks, or other networks that permit that transfer and/or reception of data. As illustrated, the system 100 may include one or more network layers, such as Interior Gateway Protocol (IGP) Sublayer 102, Bi-Directional Forwarding Detection (BFD) Sublayer 104, MPLS Traffic Engineering (TE) Sublayer 106, MPLS Fast Reroute (FRR) Sublayer 108, Ethernet Sublayer 110, SONET Sublayer 112, Optical Add Drop Multiplexer (OADM) Sublayer 114, WDM Sublayer 116, and Fiber Sublayer 118. System 100 further depicts multiple nodes, network paths, network links, and other network components at each network layer. For example, SONET Sublayer 112 and OADM Sublayer 114 depict multiple optical add drop multiplexers. WDM Sublayer 116 and Fiber Sublayer 118 depict multiple wavelength division multiplexers.

Other layers, (not shown) may include the Service Control Layer the Service Bearer Layer. The Service Control Layer may support Control Signaling Traffic, which may have the characteristics of low traffic volume, but at the highest priority. The Service Bearer Layer may be designed to support Voice, Video and Data Traffic, which has the characteristics of low to high traffic volume and at various different priorities. Data Traffic may tolerate delays, and even some packet loss, relying on retransmission at the sender side, or very low tolerance to latencies and jitter for voice traffic, but relatively low volumes of traffic at the subscriber level, but can be aggregated to tremendous volumes of voice data at aggregation points.

IGP Sublayer 102 and BFD Sublayer 104 may comprise IP control layers. These layers may be designed to support routing and other control traffic used to inform routers about the paths and routes in the network and other state information. Logically beneath the IP control layers there may be an IP Data Layer for forwarding IP traffic.

MPLS TE Sublayer 106 and MPLS FRR Sublayer 108 may comprise MPLS control layers. These layers may be designed to support control traffic for MPLS, which may include signaling Resource Reservation Protocol (RSVP) to setup Traffic Engineering Tunnels, distributing labels to adjacent MPLS routers using Label Distribution Protocol (LDP) or Targeted Label Distribution Protocol (TLDP) or other MPLS control traffic. Logically beneath the MPLS control layers there may be a MPLS Data Layer. This layer may be designed to forward MPLS traffic based on the traffic's respective MPLS Label.

Ethernet Sublayer 110 may be a data link layer. This layer may provides the framing and access to the physical media. Ethernet Sublayer 110 may use Ethernet or other Data Link layer protocols. SONET Sublayer 112 may provide one or more optical channels to transport the Data Link layer frames. WDM Sublayer 116 may transport SONET traffic on wavelengths. Fiber Sublayer 118 may provide the physical optical layer.

Many of the layers, such as IGP Sublayer 102, BFD Sublayer 104, the MPLS Sublayers 106 and 108, and SONET Sublayer 112 may have their own availability mechanisms, which may run without knowledge of each other, and may duplicate availability efforts. Further, some of the conventional efforts may be fruitless since there may be cases where the backup path may actually be transported on a single fiber, and if the fiber cable breaks, then both the primary and backup paths may be broken. In contrast, embodiments described in greater detail below, especially with reference to FIG. 3, enable efforts to be coordinated across a plurality of layers of a network.

The availability design aspects of a network, such as for example, a Carrier Grade Wireless Service Provider IP Network Architecture to support IP Multimedia Subsystems (IMS) services, may be designed by at least three separate groups of highly skilled engineers:
1. IMS Services Engineers: These engineers may estimate availability by architecting solutions with a minimum of a master and backup service deployed on a master and backup server or using a load balanced solution architecture.
2. IP/MPLS Network Engineers: These engineers may estimate availability by architecting solutions by using IP Routing Protocols, such as Open Shortest Path First (OSPF), Border Gateway Protocol (BGP), or other IP mechanisms that use a master and backup, such as Virtual Router Redundancy Protocol (VRRP) (RFC 2338), MPLS TE primary and backup tunnels, FRR and other layer 2 and layer 3 mechanisms.
3. Optical Transport Network: These engineers may estimate availability by architecting solutions using SONET rings, redundant fibers and links, redundant nodes and other transport layer mechanisms.

Conventionally, application engineers may design into the application, availability mechanisms, such that if the primary service fails, which may be identified by a User Datagram Protocol (UDP) or Transmission Control Protocol (TCP) socket connection, a backup service that may be available, using either an alternate or backup UDP or TCP socket connection or some type of similar load balancing mechanisms. However, IP Network Engineers may also design availability mechanisms, without knowledge of the availability mechanisms already provisioned at the application layer. Similarly, Optical Transport Engineers may also design availability mechanisms at the SONET layer, WDM Layer and possible Fiber layers, independently of the availability mechanisms already designed at the application and IP Network layers. The result of conventional efforts may be over engineering at some segments, and insufficient availability at some other segments.

Prior methods of meeting target availability may meet the availability objective for each layer network independent of other network layers. However, the objective is to meet the end-to-end availability of the network. Even though one or more transit networks (a network layer which passes data for other network layers) may have high network availability except one, this one transit network with low availability may determine the end-to-end network availability of the overall network. Additionally, layer 1 networks may have much better network reliability than, for example, layer 3 networks. Therefore, it may not be necessary for network planners to improve layer 1 networks without enhancing network availability of layer 3 networks. A methodology coordinating the level of network availability engineering effort across a plurality of network layers is proposed.

According to an embodiment, a methodology for designing various layers of the network architecture is described. The methodology is such that availability engineering specifications are aligned amongst the various layers and such that over engineering may be minimized (e.g., the use of additional resources at a network layer not yielding a higher availability). Additionally the methodology may enable the minimization of under engineering issues (e.g., insufficient resources applied to a network layer to enable the network layer to meet an overall target network availability.) Additionally the methodology may facilitate meeting the target system availability requirements.

According to an embodiment, a semi-heuristic approach may be used, by starting with an availability requirement for the entire system, and then assigning target availability specifications for each layer. The formal approach may start the design process from the beginning, using a target availability specification to guide the design process at each network layer ensuring that each layer may be aligned with this availability, such that the entire system may meet the target availability. The net result may be more efficient usage of resources and more optimal network availability.

Figure 2:
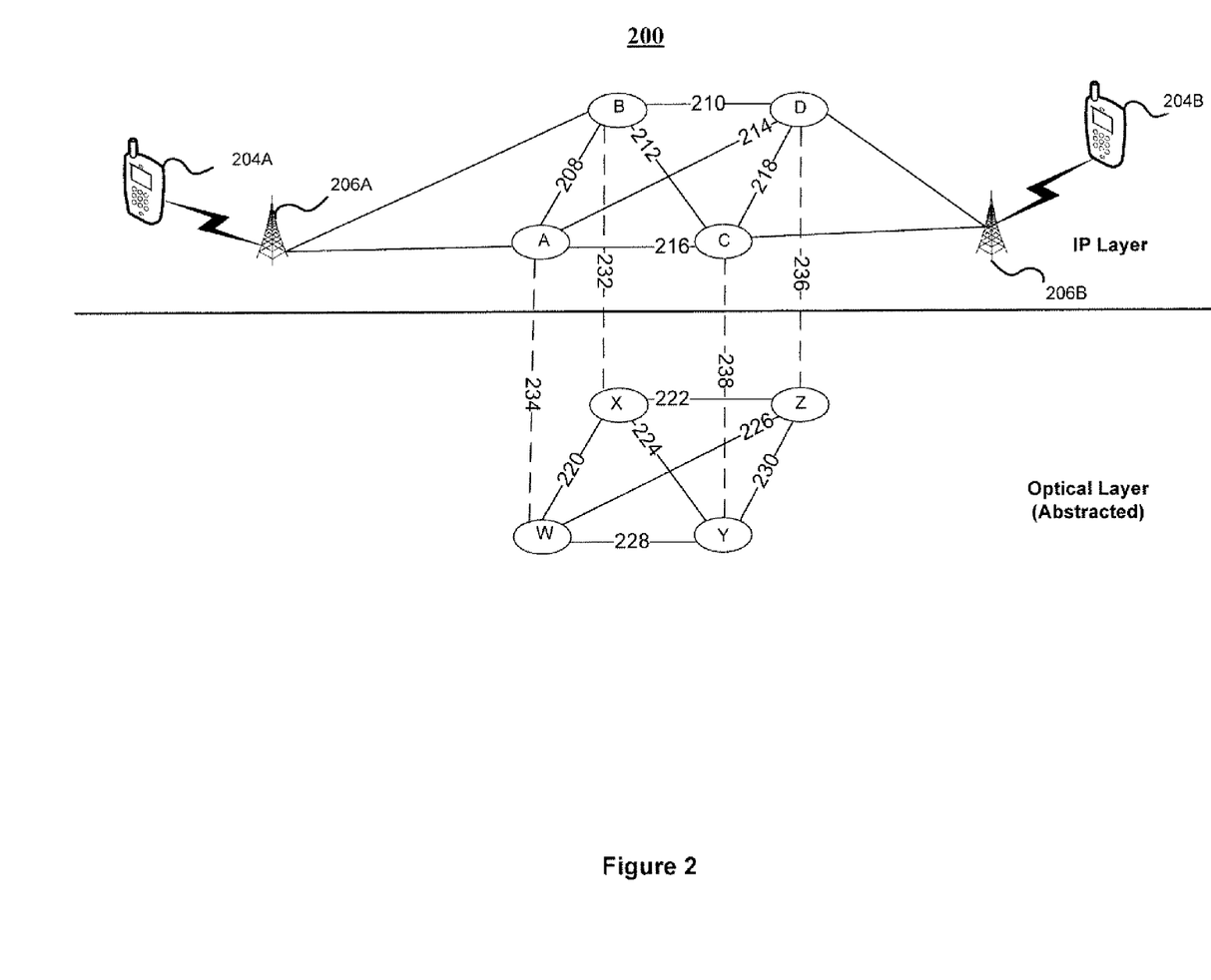
FIG. 2 is a schematic of a multi-layer network illustrating potential packet flows, in accordance with an exemplary embodiment.

Referring to FIG. 2, a simplified network architecture is depicted in accordance with an exemplary embodiment. The diagram represents an abstraction that represents how a packet moves from a source, such as wireless device 204A, to a destination, such as wireless device 204B. The diagram further depicts the layers of protocol processing which may be involved in the transmission. A packet may traverse each layer up and down the protocol stack many times at different physical locations until it reaches its final destination. Suppose that the target availability is 5-nines, i.e. 99.999% availability for the entire network. The first step may be to design the availability model. Before deriving the availability model, first an understanding is provided of the packet traversal paths from one mobile device to another.

A network 200 is depicted containing network paths 208, 210, 212, 214, 216, 218, 220, 222, 224, 226, 228, and 230. Network 200 may be connected by one or more links to wireless transmitters/receivers 206A and 206B. Wireless transmitters/receivers 206A and 206B may enable communication between one or more wireless devices, such as wireless devices 204A and 204B. Network 200 may contain nodes A, B, C, and D at an IP layer. Network 200 may contain nodes W, X, Y, and Z at an Optical Layer (abstracted). Packet paths 232,

234, 236, and 238 may represent the path of a packet between nodes at an IP layer and nodes at an optical layer in either direction.

The number of times a packet has to travel between layers may depend upon a level of integration of protocol layers at the network nodes. Non-integrated architecture may require a packet to travel to a different node to perform functionality that occurs at a different layer. For example, forwarding decisions may be made at the IP layer and thus in order for a forwarding decision to be made a packet may have to be forwarded from an optical layer node to an IP layer node in an non-integrated architecture and then returned to the optical layer node for transport. For example, if network 200 implements a non-integrated architecture, a packet traveling from wireless device 204A to wireless device 204B via nodes A and D may travel from node A to node W across packet path 234. The packet may then travel across link 228 to node Y. Node Y may send the packet to node C where a forwarding decision may be made. The packet may return from node C to node Y to be forwarded across link 230 to node Z. The packet may be forwarded from node Z across packet path 236 to node D. Similarly, a packet traveling across a non-integrated architecture from nodes B to C via node Z, may have to traverse packet path 236 to and from node D in order to receive a forwarding decision. A difference between non-integrated architecture and integrated architecture may be that the forwarding decisions in non-integrated architecture may be made at the IP layer, and different networking nodes may be used for the optical transport. For example, this may be reflective of the issues found in IP Asynchronous Transfer Mode (ATM) networks, where the IP routers may be physically segregated from the ATM switches.

In contrast, if network 200 is an integrated architecture, a packet traveling from wireless device 204A to wireless device 204B via nodes A and D, the optical path may be maintained from optical node W to optical node Z. Specifically, a packet received at node A may be transmitted via packet path 234 to node W. Node W may transmit the packet via link 228 to node Y. Node Y may transmit the packet via link 230 to node Z. Node Z may transmit the packet via packet path 236 to node D. Thus a packet may traverse two very different paths depending on the level of integration of the networking device and the functionality of the nodes. The impact on the availability may be significant due at least in part to the increased number of paths a packet may traverse in a non-integrated architecture.

If the availability for an integrated architecture is computed, it may be shown that for a packet to traverse from one mobile device to the other, there may be the following paths:
1. a w z d
2. a w y z d
3. a w x z d
4. a w x y z d
5. b x z d
6. b x y z d
7. b x w z d
8. b x w y z d If it is assumed that the availability of each device is 99%=0.99 or ProbFAILURE=1−0.99=0.01 OR 1%, then the following overall availability is obtained:

$A1 = (0.99)4 = 0.96059601$ $A2 = (0.99)5 = 0.9509900499$ $A3 = (0.99)5 = 0.9509900499$ $A4 = (0.99)6 = 0.941480149401$ $A5 = (0.99)4 = 0.96059601$ $A6 = (0.99)5 = 0.9509900499$ $A7 = (0.99)5 = 0.9509900499$ $A8 = (0.99)6 = 0.941480149401$

Availability of a system $(Asystem) = A1 + A2 + A3 + A4 + A5 + A6 + A7 + A8$ $Asystem = 2*(99.9600) + 4*(99.9500) + 2*(99.9400)$ $Asystem = 1 - [(1-A1)*(1-A2)*(1-A3)*(1-A4)*(1-A5)*(1-A6)*(1-A7)*(1-A8)]$ $Asystem = 1 - [(1-0.96059601)*(1-0.9509900499)*(1-0.9509900499)*(1-0.941480149401)*(1-0.96059601)*(1-0.9509900499)*(1-0.9509900499)*(1-0.941480149401)]$ $Asystem = 1 - [(0.03940399)*(0490099501)*(0490099501)*(0.058519850599)*(0.03940399)*(0490099501)*(0490099501)*(0.058519850599)]$ $Asystem = 1 - [1.69916591903327980652423496 01364e-16]$ $Asystem = -0.9999999999999999983008340809667202$ However, for the actual availability computation, redundant values may be subtracted, such as the probability of failure of various 2nd order and 3rd order and 4th order failures, for example:
1. both a and b failing
2. both c and d failing
3. both a and b and both c and d failing And so on.

This may result in computations and analysis that are difficult to process.

If the availability for non-integrated architecture is computed, it may be shown that for a packet to traverse from one mobile device to the other, there may be the following paths:
9. a w z d
10. a w y c y z d
11. a w x b x z d
12. a w x b x y c y z d
13. b x z d
14. b x y c y z d
15. b x w a w z d
16. b x w a w y c y z d Now assuming the availability of each device is 99%=0.99 or ProbFAILURE=1−0.99=0.01 OR 1%, then the following overall availability is obtained:

$A1 = (0.99)4 = 0.96059601$ $A2 = (0.99)7 = 0.93206534790699$ $A3 = (0.99)7 = 0.93206534790699$ $A4 = (0.99)9 = 0.913517247483640899$ $A5 = (0.99)4 = 0.96059601$ $A6 = (0.99)7 = 0.93206534790699$ $A7 = (0.99)7 = 0.93206534790699$ $A8 = (0.99)9 = 0.913517247483640899$ $$A_{system} = A1 + A2 + A3 + A4 + A5 + A6 + A7 + A8$$

$$= 2*(99.9600) + 4*(99.9500) + 2*(99.9400)$$

$$= 1 - [(1-A1)*(1-A2)*(1-A3)*(1-A4)*$$

$$(1-A5)*(1-A6)*(1-A7)*(1-A8)]$$

$$= 1 - [(1-0.96059601)*(1-0.93206534790699)*$$

$$(1-0.93206534790699)*$$

$$(1-0.913517247483640899)*$$

$$(1-0.96059601)*(1-0.93206534790699)*$$

$$(1-0.93206534790699)*$$

$$(1-0.913517247483640899)]$$

$$= 1 - [(0.03940399)*(0.06793465209301)*$$

$$(0.06793465209301)*(0.086482752516359101)*$$

$$[(0.03940399)*(0.06793465209301)*$$

$$(0.06793465209301)*(0.086482752516359101)]$$

$$= 1 - [2.4734596504710521561420063464877e - 10]$$

$$= 0.9999999997526540349528947843858$$

$$= \text{nine 9's}$$

However, if a and b both fail, with ProbFAILURE=0.01×0.01=0.0001 or c and d both fail with ProbFAILURE=0.01×0.01=0.0001.

The availability may be more accurately represented as:

$$\text{Availability} = 1 - [(ProbFAILURE\ a)*(ProbFAILURE\ b) +$$

$$(ProbFAILURE\ c)*(ProbFAILURE\ d) +$$

$$(ProbFAILURE\ a)*(ProbFAILURE\ b)*$$

$$(ProbFAILURE\ c)*(ProbFAILURE\ d)]$$

$$= 1 - [.001 + .001 + .00000001] = .9979999$$

However, for the actual availability computation, the redundant values may be subtracted, such as the probability of failure of various 2nd order and 3rd order and 4th order failures, for example:
1. both a and b failing
2. both c and d failing
3. both a and b and both c and d failing And so on.

This may result in computations and analysis that are difficult to process. In large networks, it may be very difficult to calculate the exact availability, as the problem may grow exponentially as more and more potential paths are added.

According to an exemplary embodiment, the availability of a particular network architecture may be calculated by exploiting the fact only the high order terms may be considered and the small order terms may be assumed to be insignificant (e.g., disregarded and excluded from calculation in an approximation). For example, an approximation approach may be used to determine availability in highly integrated architecture. The computation may be greatly simplified, with negligible loss of accuracy, by focusing on the highest probability of failure and subtracting 1. For example, the network may fail, only under the following scenarios:

17. both a and b fail
18. both c and d fail
19. (both a and b fail) AND (both c and d fail)—(Disregard this scenario because of the 4 terms)
20. both w and x fail
21. both y and z fail
22. (both w and x fail) AND (both y and z fail)—(Disregard this scenario because of the 4 terms)

Availability may be approximated as follows:

$$\text{Availability} = 1 - [P(\text{both } a \text{ and } b \text{ fail}) +$$

$$P(\text{both } c \text{ and } d \text{ fail}) +$$

$$P(\text{both } w \text{ and } x \text{ fail}) +$$

$$P(\text{both } y \text{ and } z \text{ fail})]$$

$$= 1 - [.012 + .012 + .012 + .012]$$

$$= 1 - [.0004]$$

$$= .9996$$

$$= 99.9\%$$

This may be a significantly easier and more reasonable number to compute that the computation using the exhaustive approach. Note that the terms that were disregarded may have very little impact on this result. For example, if the probability ((both a and b fail) AND (both c and d fail)) is computed, this value works out to be: 0.012*0.012=0.00000001. So this may not impact the availability approximation.

An approximation approach may also be used with non-integrated architecture. The computation may greatly simplified, with negligible loss of accuracy, by focusing on the highest probability of failure and subtracting 1. For example, the network may fail, only under the following scenarios:
23. both a and b fail
24. both c and d fail
25. (both a and b fail) AND (both c and d fail)—(Disregard this scenario because of the 4 terms)
26. both w and x fail
27. both y and z fail
28. (both w and x fail) AND (both y and z fail)—(Disregard this scenario because of the 4 terms)
29. both c and b fail
30. both x and y fail
31. (both c and b fail) AND (both a and d fail)—(Disregard this scenario because of the 4 terms)

The availability may now be approximated as follows:

$$\text{Availability} = 1 - [P(\text{both } a \text{ and } b \text{ fail}) +$$

$$P(\text{both } c \text{ and } d \text{ fail}) +$$

$$P(\text{both } w \text{ and } x \text{ fail}) +$$

$$P(\text{both } y \text{ and } z \text{ fail})]$$

$$= 1 - [.012 + .012 + .012 + .012 + .012 + .012]$$

$$= 1 - [.0006]$$

$$= .9994$$

$$= 99.94\%$$

There may be very little difference between the integrated and non integrated designs in terms of availability. More significant to availability may be the end points of the mesh (or edge nodes of a network) for which availability is being calculated. Specifically, identifying the critical ingress and egress nodes, which, if in a failed state, may cause the overall packet path to fail may identify minimum probability of failure network paths. According to an embodiment, this determination may be used in the design for availability.

Thus, it may be beneficial for network designs at each layer to be designed with the same availability. As described above, a failure at one layer may bring down an entire packet path. Accordingly, over engineered network layers may have little benefit on the overall reliability of the network architecture. Furthermore, there may be a penalty in cost, which may provide no benefit. The method above for approximating the reliability of each layer of a network may simplify the design process for designing network architectures availability. Efficiency may also be gained by aligning network traffic with different priority requirements on the appropriate network architecture designed with different degrees of availability. For example, network traffic requiring a high Quality of Service (QoS), such as voice traffic, may be routed over a network architecture with high availability. Network traffic, such as data, which may not require as high of a QoS as voice traffic, may be routed over a network architecture with lower availability. The routing may use a separate network or a network path within a network determined to have the appropriate level of availability.

Figure 3:
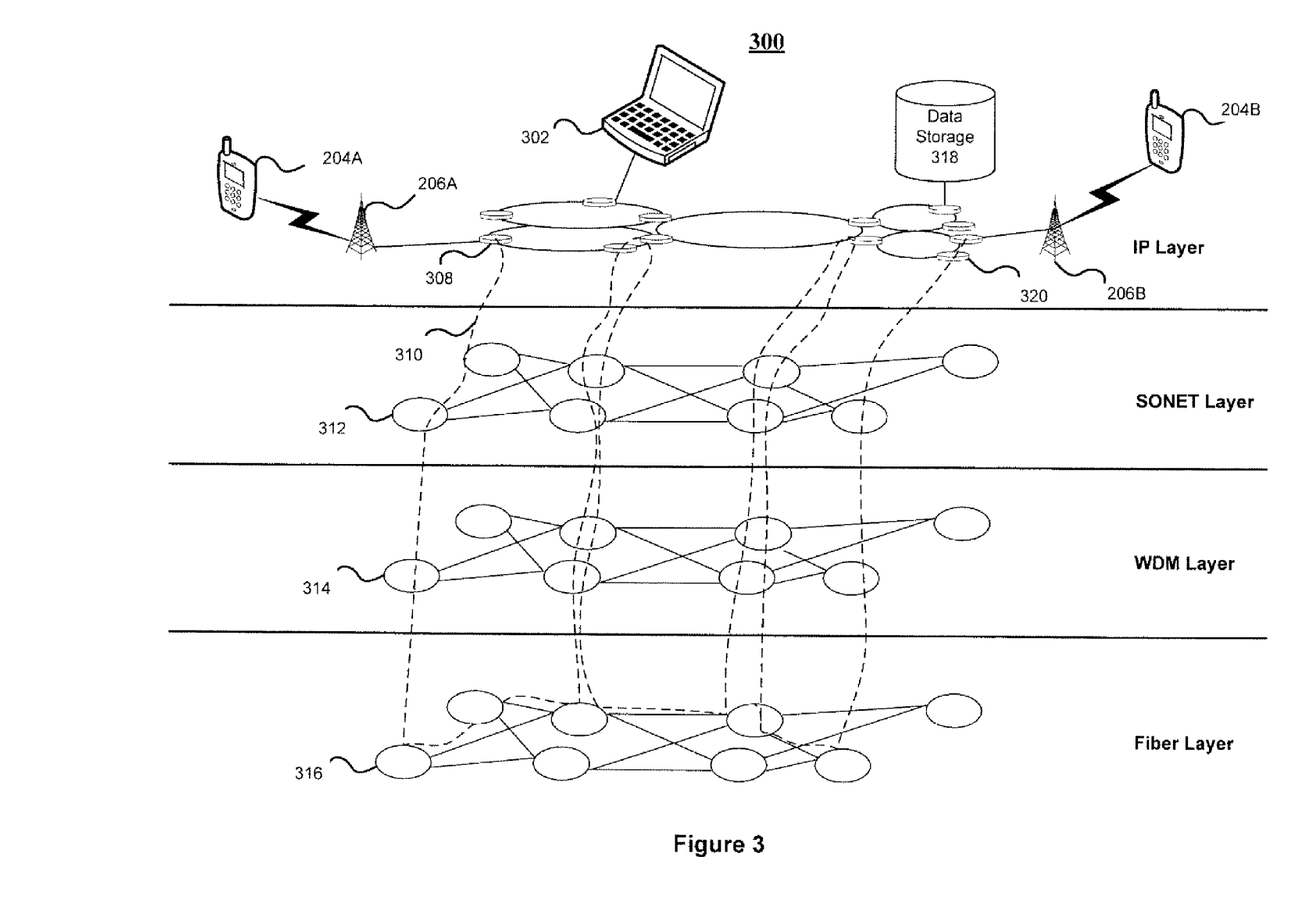
FIG. 3 is a schematic of a multi-layer network analysis and design system, in accordance with an exemplary embodiment.

FIG. 3 depicts a schematic of a multi-layer network analysis and design system, in accordance with an exemplary embodiment. As shown, the network 300 may be a simplified depiction of a network illustrating the IP, SONET, Wavelength Division Multiplexing and Fiber layers. It may be readily appreciated that other layers may be utilized and that other physical medium may be utilized. The wireless transmitters/receivers 206A and 206B may be communicatively coupled to the network 300. One or more wireless devices, such as the wireless devices 204A and 204B may be communicatively coupled to the network 300 via the wireless transmitters/receivers 206A and/or 206B. The network 300 may contain one or more nodes at one or more layers such as the nodes 308, 310, 312, 314, 316, and 320. One or more computing devices, servers, or other processing elements, such as the computer 302 may be communicatively coupled to the network 300. The data storage 318 may be communicatively coupled to the network 300.

The data storage 318 may be network accessible storage and may be local, remote, or a combination thereof to the nodes 308, 310, 312, 314, 316, and 320. The data storage 318 may utilize a redundant array of inexpensive disks (RAID), a redundant array of inexpensive nodes (RAIN), tape, disk, a storage area network (SAN), or other computer accessible storage. In one or more embodiments, the data storage 318 may be a database, such as an Oracle database, a Microsoft SQL Server database, a DB2 database, a MySQL database, a Sybase database, an object oriented database, a hierarchical database, or other database. The data storage 318 may store network path information identifying one or more network paths between one or more nodes. Network path information may include edge network equipment information, core network equipment information, customer premise equipment information, network routing information, a hop count for a network path, bandwidth information associated with a network path, congestion information associated with a network path, latency information associated with a network path, and/or QOS information associated with a network path. The data storage 318 may store reliability data such as node or other network equipment probability of failure statistics, measurements or other data associated with network equipment reliability. Reliability data may be estimated, based upon measurements, and/or based upon manufacturer or equipment provider data. The data storage 318 may also store reliability data associated with one or more network links, network paths, and/or other network components. The data storage 318 may store data received and/or queried from a network management system, a Management Information Base (MIB), routers, nodes, switches and/or other network components.

The computer 302 may be a desktop computer, a laptop computer, a server or other computer capable of performing private network backbone analysis. The computer 302 may receive data from user input, a network management system, a network provisioning system, a management information base, a network services ordering system, a database, a file, a web service, and/or an application programming interface. The computer 302 may query other systems and/or local or remote storage such as the data storage 318 to obtain network information.

The computer 302 may model a network using the availability approximations described above in reference to FIG. 2. The computer 302 may provide a user interface enabling the setting, modification, deletion, and/or querying of one or more network reliability values. The computer 302 may also enable a user to generate, display, and/or output one or more reports of network availability data, network analysis, network design, and/or probability of failure analysis. The computer 302 may model a network using data associated with network routing information, a Management Information Base (MIB), user input, and/or other data which may be stored on data storage 318. The computer 302 may enable the calculation of minimum probability of failure values for a network component, a network link, and/or a network path. The computer 302 may calculate the probability of failure of a network path between two nodes across one or more layers or transit networks of a network. For each pair of nodes on a network layer or transit network, the computer 302 may enable the identification of a network path with the highest minimum probability of failure between the nodes. The computer 302 may identify the network path with the highest minimum probability of failure of all the network paths for a particular transit network. The computer 302 may then repeat this process to identify the network path with the maximum minimum probability of failure for each transit network (i.e., the highest minimum probability of failure network path between two nodes for a particular network layer). The computer 302 may then identify the maximum minimum probability of failure for the entire network across all layers. This maximum minimum probability of failure may be used as a benchmark number to ensure that each network layer or transit network is engineered towards this same level. This may reduce the chances or over engineering and/or under engineering one or more layers of the network.

The various components of the system 300 as shown in FIG. 3 may be further duplicated, combined and/or integrated to support various applications and platforms. Additional elements and/or layers may also be implemented in the systems described above to support various applications.

Figure 4:
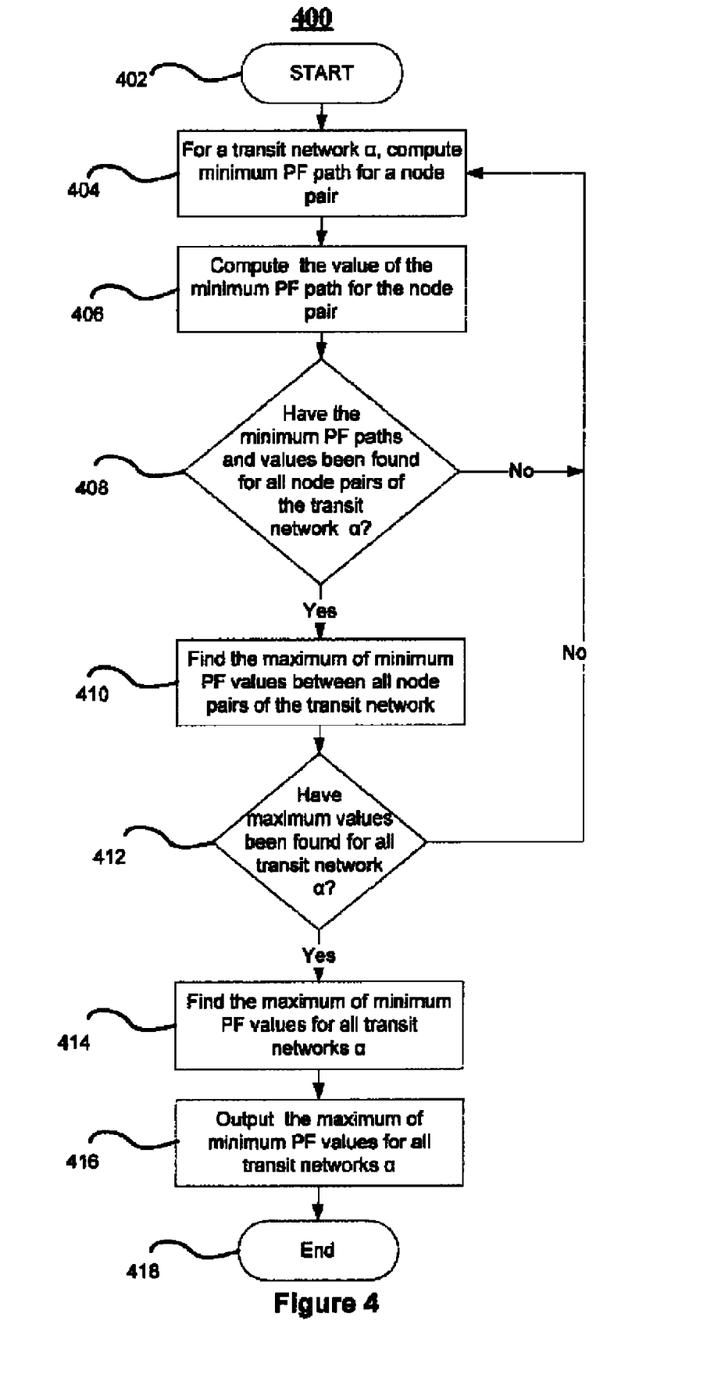
FIG. 4 depicts a flow chart for a method for implementing a multi-layer network analysis and design system, in accordance with an exemplary embodiment.

FIG. 4 depicts a flow chart for a method for implementing a multi-layer network analysis and design system, in accordance with an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 300 shown in FIG. 3 by way of example, and various elements of the system 300 are referenced in explaining the example method of FIG. 4. Each block shown in FIG. 4 represents one or more processes, methods, or subroutines carried in the exemplary method 400. A computer readable media comprising code to perform the acts of the method 400 may also be provided. A network may be comprised of different layers of networks including, but not limited to: IP of Layer 3 (L3), ATM, Ethernet and Frame Relay of L2, MPLS of between L2 and L3, and SONET and WDM of L1. Data traffic may travel across the multi-layer networks from a source to a destination. Typically, network planners and engineers designed each layer transit network for the maximum availability independently of other layer transit networks. While this approach may yield the optimal design of one layer transit network, the other transit layer networks may be over-engineered or sub-engineered. To ensure the end-to-end network availability, a plurality of transit networks in different layers may be designed to satisfy one target network availability requirement. A method for designing the end-to-end multi-layer network for the optimal overall network system design is described. The method may provide one optimal network availability requirement that may be met by a plurality of different layer transit networks. This issue may be modeled as max-min problem. A high level overview of the method is shown in FIG. 4.

Referring to FIG. 4, the exemplary method 400 may begin at block 402.

In block 404, for each transit network a, a minimum probability of failure (PF) path may be calculated for a node pair.

At block 406, for each transit network a, a minimum probability of failure (PF) path value may be calculated for a node pair.

Consider a layer $\alpha$ network that data traffic must traverse. Any network may be considered as a set of nodes and edges (or links) in graph theory. So a layer $\alpha$ network may be defined as $G^\alpha$: $G^\alpha=(V^\alpha,E^\alpha)$, where $V^\alpha$ is a set of nodes, and $E^\alpha$ is a set of links for layer $\alpha$ network.

Given $G^\alpha=(V^\alpha,E^\alpha)$, consider any source and destination node pair $(v_i^\alpha, v_j^\alpha)$, where $v_i^\alpha \in V^\alpha$ and $v_j^\alpha \in V^\alpha$. There may be multiple routes between $v_i^\alpha$ and $v_j^\alpha$. Finding the path with the minimum PF for $(v_i^\alpha, v_j^\alpha)$, may be considered equivalent to finding the shortest path between two points wherein the distance metric is equivalent to the probability of failure.

For the problem, the minimum PF paths between all pairs of nodes in $G^\alpha$ should be found. Again, this problem is the same as finding the shortest paths between all pairs of nodes in $G^\alpha$, where the distance metric here is the probability of failure.

For $G^\alpha$, then, there may be two matrices from the shortest path algorithm. The first matrix may be the set of the minimum PF paths:

$$\text{MinP}^\alpha = [\text{Min}p_{ij}^\alpha] \quad (1)$$

The other matrix is for the minimum PF values:

$$\text{MinPF}^\alpha = [\text{Min}f_{ij}^\alpha] \quad (2)$$

At block 408, it may be determined whether the minimum probability of failure (PF) paths and values have been determined for all node pairs of a transit network $\alpha$. If so, the method may continue at block 410. If the minimum probability of failure (PF) paths and values have not been determined for all node pairs of a transit network $\alpha$, the method 400 may continue at block 404.

At block 410, once all the minimum PF paths between one or more pairs of nodes in $G^\alpha$ have been computed, the maximum of minimum PF values in MinPF$^\alpha$ may be calculated.

$$\text{MaxMin}PF^\alpha = \max_{ij}(\text{Min}p_{ij}^\alpha) \quad (3)$$

The value found from (3) is the network availability requirement for a particular layer transit network, $G^\alpha$.

At block 412 it is determined whether all of the maximum minimum probability of failure values for all layer $\alpha$ networks have been found. If all of the maximum minimum probability of failure values for all layer $\alpha$ network have been found the method 400 continues at block 414. If all of the maximum minimum probability of failure values for all layer $\alpha$ networks have not been found the method 400 continues at block 404. The computer 302 and/or the data storage 318 may be used to determine the maximum minimum probability of failure values for one or more layer $\alpha$ networks.

At block 414, in order to find the end-to-end overall multi-layer network requirement, the maximum from all transit networks with different layers may be taken:

$$\text{MaxMaxMin}PF = \max_\alpha(\text{MaxMin}PF^\alpha) = \max_\alpha \max_{ij}(\text{Min}p_{ij}^\alpha) \quad (4)$$

The value of MaxMaxMinPF is the minimum probability of failures that must be satisfied by all heterogeneous layer transit networks.

At block 416, the method 400 may output the maximum of minimum probability of failure failures for all transit networks $\alpha$. The output may be displayed via a user interface, emailed, printed, provided via a web interface, or provided through other electronic communications. The computer 302 may be used to generate or provide one or more outputs.

At block 418, the method 400 may end.

The method 400 may provides a number of benefits including, but not limited to: increased efficiency, higher network resource utilization, and higher customer satisfaction. By providing one optimal network availability requirement for all layers of networks, the problems of over-engineering in typically lower layer networks may be eliminated, which may result in significant cost savings. By avoiding over-engineering in the multi-layer networks, network planners may meet the network availability requirements with less resources, thus resulting in higher network utilization. This end-to-end multi-layer network design may provide the same network availability for networks of all layers, thus avoiding under-engineering in higher layer networks as well as avoiding over-engineering. Users can potentially expect less network down-times.

The above algorithm may provide a method of finding one target network availability or minimum probability of failure that all networks of different layers must satisfy in order to design the network with highest end-to-end availability. When data packets traverse from a source to a destination, the packets must pass through different layers of network. Instead of optimizing network availability for each layer network, the proposed algorithm optimizes the end-to-end network availability suitable for today's multi-layer/multi-domain networks. The above algorithm finds the shortest paths for all node pairs in each layer network. Here, the cost metric for the minimization is the probability of failure for each link. Finding the shortest paths for node pairs may be computed for all transit layer networks. The above algorithm may find the maximum value of minimum (shortest) values for all layer networks. After finding the maximum values from all layer networks, may find the maximum value from the maximum values found for each transit layer network. The maximum value found across the plurality of transit networks may be the minimum probability of failure that all transit networks of different layers must satisfy as the target availability objective.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer implemented method, comprising:
   determining, using a computer model of a network, a minimum probability of failure path between a pair of network nodes at a first network layer for one or more pairs of network nodes;
   calculating, using a processor and stored network data, a value for the minimum probability of failure for the identified minimum probability of failure path between the pair of network nodes at the first network layer for the one or more pairs of network nodes;
   identifying, using a processor, a maximum of the determined minimum probability of failure values for the one or more pairs of network nodes for the first network layer;
   determining, using the computer model of a network, a minimum probability of failure path between a pair of network nodes at one or more secondary network layers for one or more pairs of network nodes;
   calculating, using a processor and stored network data, a value for the minimum probability of failure for the identified minimum probability of failure path at the one or more secondary network layers;
   identifying, using a processor, a maximum of the determined minimum probability of failures for each of the one or more secondary network layers; and
   outputting, via a user interface, one or more maximum of the determined minimum probability of failure values for one or more network layers for one or more pairs of network nodes of the modeled network.

2. The method of claim 1, further comprising:
   identifying a maximum of all the determined minimum probability of failure values for the modeled network using the identified maximum of the determined minimum probability of failure values for one or more layers of the network; and
   outputting, via the user interface, the identified maximum of all the determined minimum probability of failure values for the modeled network, wherein the identified maximum of all the determined minimum probability of failure values for the modeled network is used as a benchmark for coordinating network engineering efforts across one or more network layers.

3. The method of claim 2, further comprising:
   receiving user input specifying a target network availability;
   comparing the identified maximum of all the determined minimum probability of failure values for the modeled network with the target network availability; and
   in the event the identified maximum of the determined minimum probability of failure values for the modeled network does not meet the target network availability receiving input from a user enabling the user to modify one or more values of the modeled network and to recalculate a maximum of determined minimum probability of failure values for the modeled network using the one or more modified values.

4. The method of claim 1, further comprising:
   identifying a minimum of all the determined minimum probability of failure values for one or more network layers using the identified minimum of the determined minimum probability of failure values for one or more layers of the network; and
   outputting, via the user interface, the minimum of all the determined minimum probability of failure values for the modeled network, wherein the identified minimum of the determined minimum probability of failure values for the modeled network is used to prioritize one or more tasks for network engineering efforts.

5. The method of claim 1, where the computer model of the network utilizes, at least in part, network routing information to identify a minimum probability of failure path.

6. The method of claim 1, further comprising using one or more minimum probability of failure values of the modeled network to determine, at least in part, routing for one or more portions of the modeled network, wherein at least a portion of low priority network traffic is routed over one or more network paths with a high minimum probability of failure.

7. The method of claim 1, further comprising using one or more minimum probability of failure values of the modeled network to determine, at least in part, routing for one or more portions of the modeled network, wherein at least a portion of high priority network traffic is routed over one or more network paths with a low minimum probability of failure.

8. The method of claim 7, wherein the priority of the network traffic is determined by a Quality of Service (QOS) associated with the network traffic.

9. The method of claim 1, wherein determining a value for the minimum probability of failure for the identified minimum probability of failure path between a pair of network nodes excludes probability of failure calculations other than first order probability of failure calculations.

10. The method of claim 1, wherein excluding the probability of failure calculations other than first order probability of failure calculations comprises excluding the probability of compound failures of network components whose individual probability of failure is calculated in probability of failure calculation.

11. The method of claim 1, further comprising generating the computer model of the network utilizing at least one of: data associated with a Management Information Bases (MLBs), network routing data, and user inputted data.

12. The method of claim 1, further comprising storing, in a database, one or more values for determining a minimum probability of failure.

13. The method of claim 12, wherein the one or more values include: a meantime to failure of network equipment obtained from testing, a meantime to failure of network equipment obtained from statistical analysis, and a meantime to failure of network equipment provided by one of a network equipment manufacturer and a network equipment supplier.

14. A computer readable media containing computer executable code comprising code to perform the acts of the method of claim 1.

15. A system, comprising:
one or more network elements communicatively coupled to a network;
a database communicatively coupled to the network, the database comprising information associated with at least one of the one or more network elements and information associated with one or more network links of the network;
a computer model of the network based at least on a portion of the information of the database;
a processor communicatively coupled to the network, wherein the processor is configured to:
  determine, using the computer model of a network, a minimum probability of failure path between a pair of network nodes at a first network layer for one or more pairs of network nodes;
  calculate a value for the minimum probability of failure for the identified minimum probability of failure path between the pair of network nodes at the first network layer for the one or more pairs of network nodes;
  identify a maximum of the determined minimum probability of failure values for the one or more pairs of network nodes for the first network layer;
  determine, using the computer model of a network, a minimum probability of failure path between a pair of network nodes at one or more secondary network layers for one or more pairs of network nodes;
  calculate a value for the minimum probability of failure for the identified minimum probability of failure path at the one or more secondary network layers;
  identify a maximum of the determined minimum probability of failures for each of the one or more secondary network layers;
  identify a maximum of all the determined minimum probability of failures for each of the one or more secondary network layers; and
  provide output, via the user interface, the identified maximum of all the determined minimum probability of failure values for the modeled network.

16. A processor, configured to:
determine, using a computer model of a network, a minimum probability of failure path between a pair of network nodes at a first network layer for one or more pairs of network nodes;
calculate a value for the minimum probability of failure for the identified minimum probability of failure path between the pair of network nodes at the first network layer for the one or more pairs of network nodes;
identify a maximum of the determined minimum probability of failure values for the one or more pairs of network nodes for the first network layer;
determine, using the computer model of a network, a minimum probability of failure path between a pair of network nodes at one or more secondary network layers for one or more pairs of network nodes;
calculate a value for the minimum probability of failure for the identified minimum probability of failure path at the one or more secondary network layers;
identify a maximum of the determined minimum probability of failures for each of the one or more secondary network layers; and
outputting, via a user interface, one or more maximum of the determined minimum probability of failure values for one or more network layers for one or more pairs of network nodes of the modeled network.

17. The processor of claim 16, wherein the processor is further configured to:
  identify a maximum of all the determined minimum probability of failure values for the modeled network using the identified maximum of the determined minimum probability of failure values for one or more layers of the network; and
  provide output, via a user interface, including the identified maximum of all the determined minimum probability of failure values for the modeled network, wherein the identified maximum of the determined minimum probability of failure values for the modeled network is used as a benchmark for coordinating network engineering efforts across network layers.

18. The processor of claim 17, wherein the processor is further configured to:
  provide a user interface for receiving input specifying a target network availability;
  compare the identified maximum of the determined minimum probability of failure values for the modeled network with the target network availability; and
  in the event the identified maximum of the determined minimum probability of failure values for the modeled network does not meet the target network availability, receiving input from a user enabling the user to modify one or more values of the modeled network and to recalculate a maximum of determined minimum probability of failure values for the modeled network using the one or more modified values.

19. The processor of claim 16, wherein the processor is further configured to:
  identify a minimum of all the determined minimum probability of failure values for one or more network layers for the modeled network using the identified minimum of the determined minimum probability of failure values for one or more layers of the network;
  provide output, via a user interface, including the identified minimum of all the determined minimum probability of failure values, wherein the identified minimum of the determined minimum probability of failure values for the modeled network is used to prioritize one or more tasks for network engineering efforts.

20. The processor of claim 16, wherein the processor is further configured to: utilize network routing information and the computer model of the network, at least in part, to determine a minimum probability of failure path.

21. The processor of claim 16, wherein the processor is further configured to:
  use one or more minimum probability of failure values of the modeled network to determine, at least in part, routing for one or more portions of the modeled network, wherein at least a portion of low priority network traffic is routed over one or more network paths with a high minimum probability of failure.

22. The processor of claim 16, wherein the processor is further configured to:
  use one or more minimum probability of failure values of the modeled network to determine, at least in part, routing for one or more portions of the modeled network, wherein at least a portion of high priority network traffic is routed over one or more network paths with a low minimum probability of failure.

* * * * *